United States Patent [19]

Whitehead, Jr. et al.

[11] 4,417,839
[45] Nov. 29, 1983

[54] AUTOMATIC HATCHERY TRAY DUMPER

[75] Inventors: William F. Whitehead, Jr., Farmington; James A. Dickens, Watkinsville; Benjamin C. Haynes, Jr., Athens, all of Ga.

[73] Assignee: The United States of America as represented by the Secretary of Agriculture, Washington, D.C.

[21] Appl. No.: 248,371

[22] Filed: Mar. 27, 1981

Related U.S. Application Data

[63] Continuation-in-part of Ser. No. 85,440, Oct. 16, 1979, abandoned.

[51] Int. Cl.³ .............................................. B65G 65/23
[52] U.S. Cl. .................................... 414/303; 414/421
[58] Field of Search ............... 414/303, 403, 419, 420, 414/421

[56] References Cited

U.S. PATENT DOCUMENTS

| | | | |
|---|---|---|---|
| 3,109,531 | 11/1963 | Jackson | 414/421 X |
| 3,244,304 | 4/1966 | Pollack, Jr. et al. | 414/421 |
| 3,369,479 | 2/1968 | Oppenheimer et al. | 414/421 X |
| 3,814,270 | 6/1974 | Murphy | 414/421 X |
| 4,066,107 | 1/1978 | Karp et al. | 414/303 X |

OTHER PUBLICATIONS

Publication ARS-S-186 entitled "Automated Waste Handling System for Layer Chicken Hatcheries".

*Primary Examiner*—Robert B. Reeves
*Assistant Examiner*—David F. Hubbuch
*Attorney, Agent, or Firm*—M. Howard Silverstein; David G. McConnell; Raymond C. VonBodungen

[57] ABSTRACT

An apparatus for automatically dumping a hatchery tray is disclosed. The apparatus comprises: a lifting platform suitably fitted with a tray sensing limit switch to control a double acting air cylinder which lifts the hatchery tray on the platform up and through a 100° arc past vertical onto the open top of a hopper which receives the waste from the tray. Initial spring loaded starting and stopping devices are included as well as kick-off-arms to remove the hatchery tray from the hopper after dumping.

10 Claims, 6 Drawing Figures

4,417,839

AUTOMATIC HATCHERY TRAY DUMPER

CROSS REFERENCE TO RELATED APPLICATIONS

This is a continuation-in-part of Serial No. 85,440, filed Oct. 16, 1979 now abandoned.

BACKGROUND OF THE INVENTION

1. Field of the Invention

This invention relates to automatic handling equipment for the chicken layer industry.

2. Description of the Prior Art

In past years, improvements in equipment for the hatchery industry were involved with the handling of eggs before they hatched, and improved incubators and new storage techniques were adopted primarily to increase the hatchability of the eggs. However, very little attention was given to eliminating the problems of handling the waste product after the eggs hatch. Earlier work on handling hatchery waste was concerned with the development of a pneumatic system for transporting the waste material out of a small broiler hatchery and into a temporary holding tank (*Agricultural Research Service Report ARS-S*-152, "A vacuum System for Handling Chicken Hatchery Waste"). This waste consisted primarily of eggshells and unhatched eggs. A layer chicken hatchery has different requirements, and the difference between broiler and layer hatcheries usually begins where the chicks are sexed. In the layer hatchery, the facilities must provide for disposing of the cockerels (about one-half of the chicks) as well as the waste from the tray (shells, dead embryos, and unhatched eggs). The addition of cockerels to the waste adds considerably more protein value to the product, and rendering plants, which utilize the wastes, usually accept it more readily than that from broiler hatcheries.

SUMMARY OF THE INVENTION

The principal object of the instant invention is to automate the handling of hatchery waste in layer chicken hatcheries and to reduce the manual-labor requirements for those unpleasant and unhealthy operations associated with the handling of chicken waste.

The instant invention comprises the following working in combination: A hopper with an open top; a tray dumping means adjacent the hopper, the dumping means including tray support means to receive a tray in a horizontal, upright position, said dumping means further including support lifting means to extend said support means upwardly, in an arc, in the direction of the hopper, to dump the tray onto the hopper in a horizontal upside down position, said dumping means further including means to retract said support lifting means after dumping a tray; a speed control means connected to said dumping means to slow down the speed of said support lifting means near the end of its foremost extension so as to prevent trays from hitting said hopper with excessive force; and a tray pushing means connected to said hopper in response to retraction movement of said support lifting means.

DESCRIPTION OF THE PREFERRED EMBODIMENTS

The instant invention was developed for a hatchery in which the daily capacity was 125,000 eggs, yielding about 55,000 pullets. The waste consisted of eggshells, unhatched eggs, dead embryos, and about 55,000 cockerels. About 12,000 pound of waste per day or 1,700 pounds per hour was generated. Under manual conditions, four men were required to dump and collect in 55 gallon barrels all of the waste and eventually empty it into an open-bed dump truck for transport to a rendering plant. All empty chick trays were manually fed into the tray washer.

Figure 6:
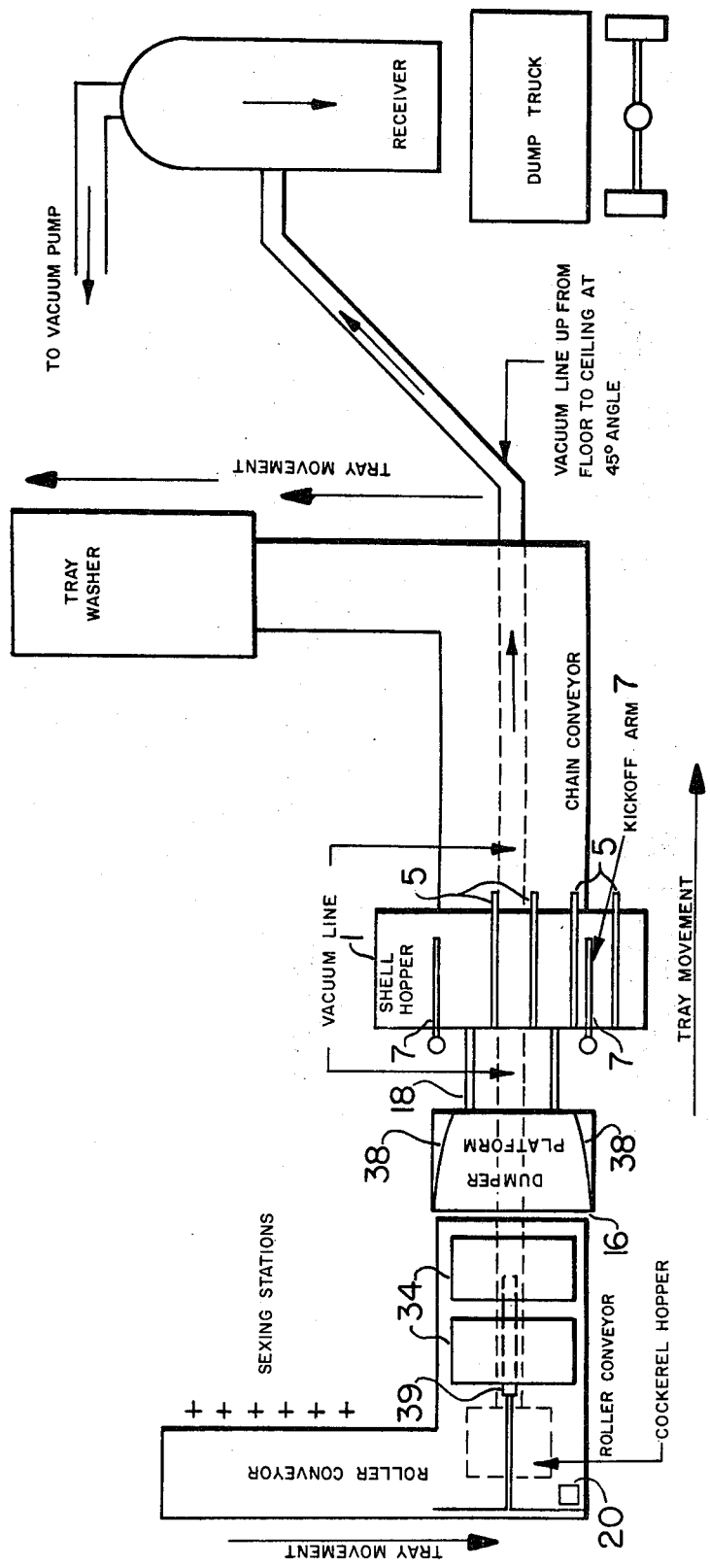
FIG. 6 is a schematic layout of an automated waste-handling system, showing each major component.

In general, a waste handling system for a layer chick operation is as shown in FIG. 6. Trays (not shown) containing approximately twelve dozen eggs are moved on a roller conveyor past a sexing station where operators remove the pullets from the cockerels and each is sent on separate conveyors for further processing. The waste in the trays is sent to the dumping platform which lifts the tray and inverts it onto a shell hopper which receives and gathers the waste. Once the tray is inverted onto the top of the shell hopper, the kickoff arms remove the tray onto another conveyor which transports it to a tray washer where it is cleaned and returned to reuse. Simultaneously, the dumper platform returns to the roller conveyor and receives another tray from the sexing station for dumping. The waste is conveyed pneumatically to a receiver which ultimately empties into a dump truck which carries the waste to a rendering plant.

Figure 1:
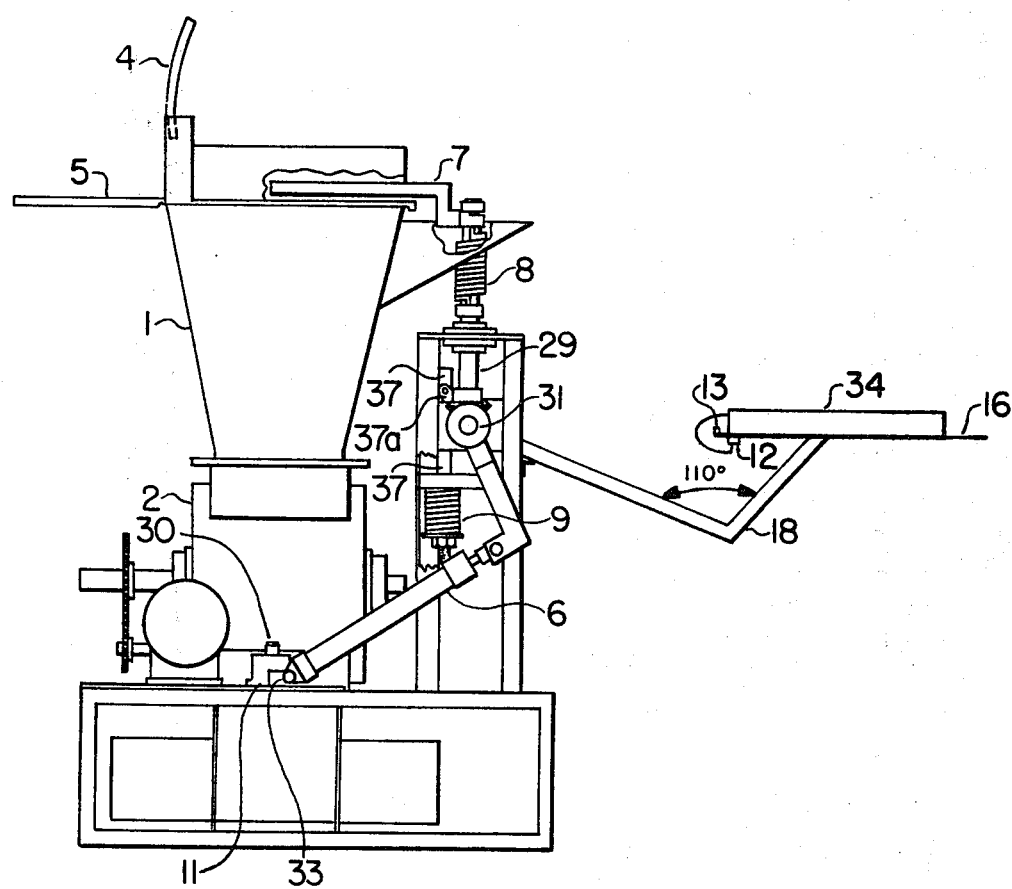
FIG. 1 is a side view of the shell hopper and automatic dumper for the automatic waste handling system in a layer chicken hatchery.
Figure 4:
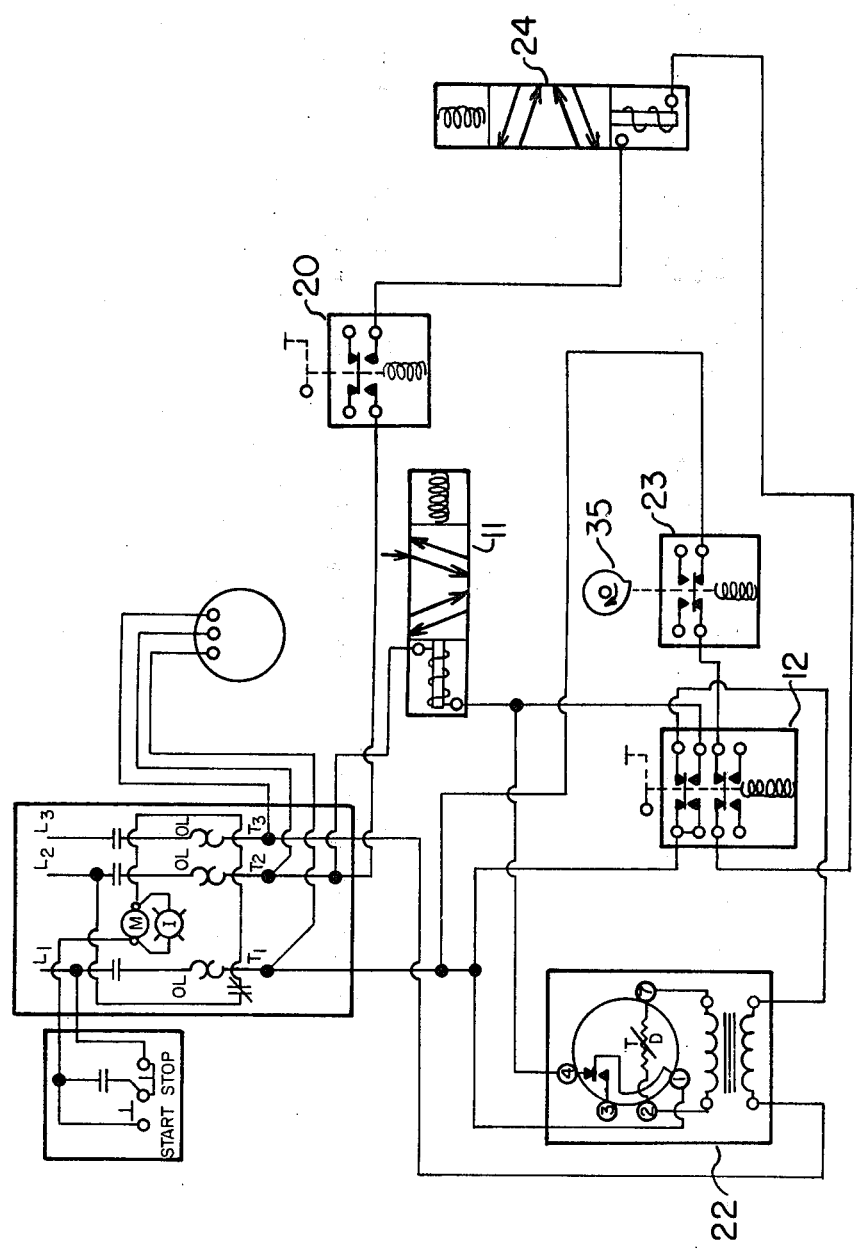
FIG. 4 is a wiring diagram for the complete dumping operation.

Turning now to the specific embodiment of the invention of the automatic hatchery tray dumper wherein 1 (of FIGS. 1 and 2) represents a hopper which is to receive waste when a hatchery tray is lifted and inverted onto the top thereof. The hatchery trays are moved directly from hatchery carts and placed on a roller conveyor (FIG. 6) that moves the trays past the sexers, who remove and segregate the chicks. As the trays progress forward the first tray strikes a ram limit switch 20 (FIGS. 4 & 6) located on the end of the conveyor (FIG. 6). Limit switch 20 actuates a double acting air-cylinder ram 39 (FIG. 6) which in turn pushes tray 34 (FIG. 1) sideways off the conveyor (FIG. 6) toward the dumper lifting platform 16 (FIG. 1). When the tray breaks contact with ram limit switch 20 (FIG. 4), the air-cylinder ram 39 (FIG. 6) retracts to accept another.

Thus subsequent trays progress forward until first tray 34 slides onto lift platform 16, and makes contact with lift platform electronic limit switch 12 (FIGS. 1 and 4), which is located in the top of the lift platform where contact with the tray can be easily made. The tray dumper is designed to operate in conjunction with hopper 1 and air lock valve 2 (FIG. 1). The dumper has a pneumatic cylinder 6 which carries a lifting platform 16 with a hatchery tray 34 seated thereon up and through a 100° arc, tilting tray 34 past vertical, and inverting it onto the open top of hopper 1 thereby dumping the contents into hopper 1. Pneumatic cylinder 6 is affixed to a solid base support member 33 on its lower end. On its upper end cylinder 6 is affixed to a hinge shaft 31. Thus, when limit switch 12 which is located at the edge of the underside of platform 16 is actuated, one set of normally open contacts close and thereby actuate lift platform solenoid air valve 11 which is located adjacent to the affixed support of cylinder 6 and communicates with cylinder 6, thus causing lift platform double-acting air-cylinder 6 to extend, thus raising lift platform 16 which is initially in a horizontal position. Simultaneously, one set of normally closed contacts (NC) 12 (FIG. 4) actuates an electronic time-delay relay 22. As platform 16 beings the ascent, cam 35 actuates limit switch 15 (FIGS. 2 & 4) which is located on the pusher-arm shaft 29 (FIG. 2) to open the circuit to ram solenoid 24 (FIG. 4) which will not allow the ram air-cylinder (FIG. 6) room to push another tray forward during the dumping operation. As platform 16 ascends, cam 35 rotates longitudinally counterclockwise on shaft 29, to open or close limit switch 15.

Figure 2:
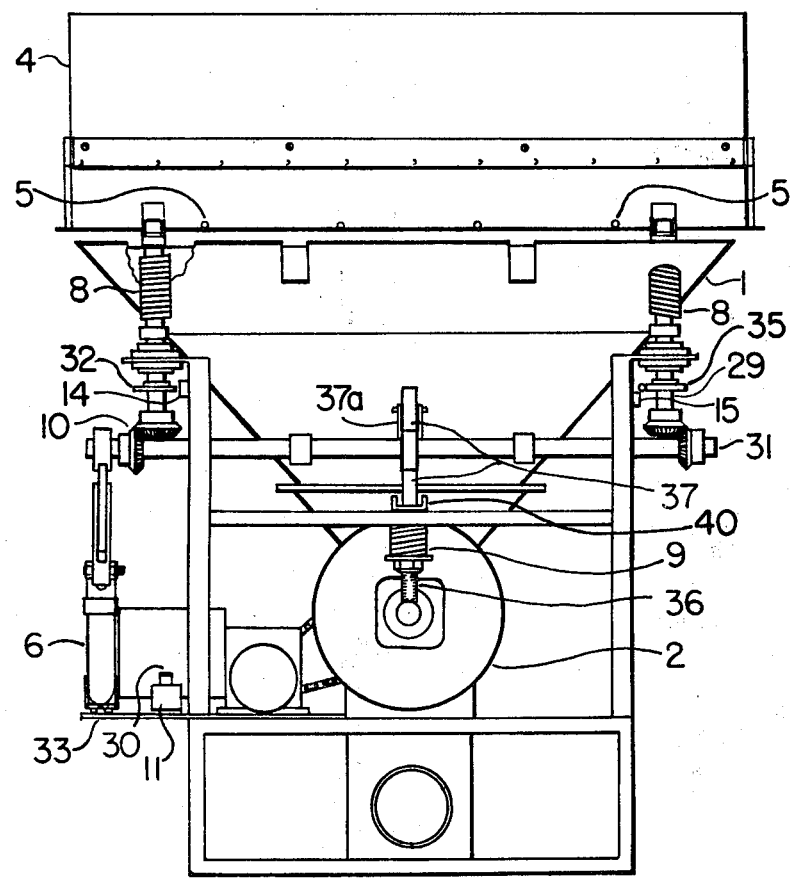
FIG. 2 is a front view of the shell hopper and automatic dumper for the automatic waste handling system for a layer chicken hatchery.
Figure 5:
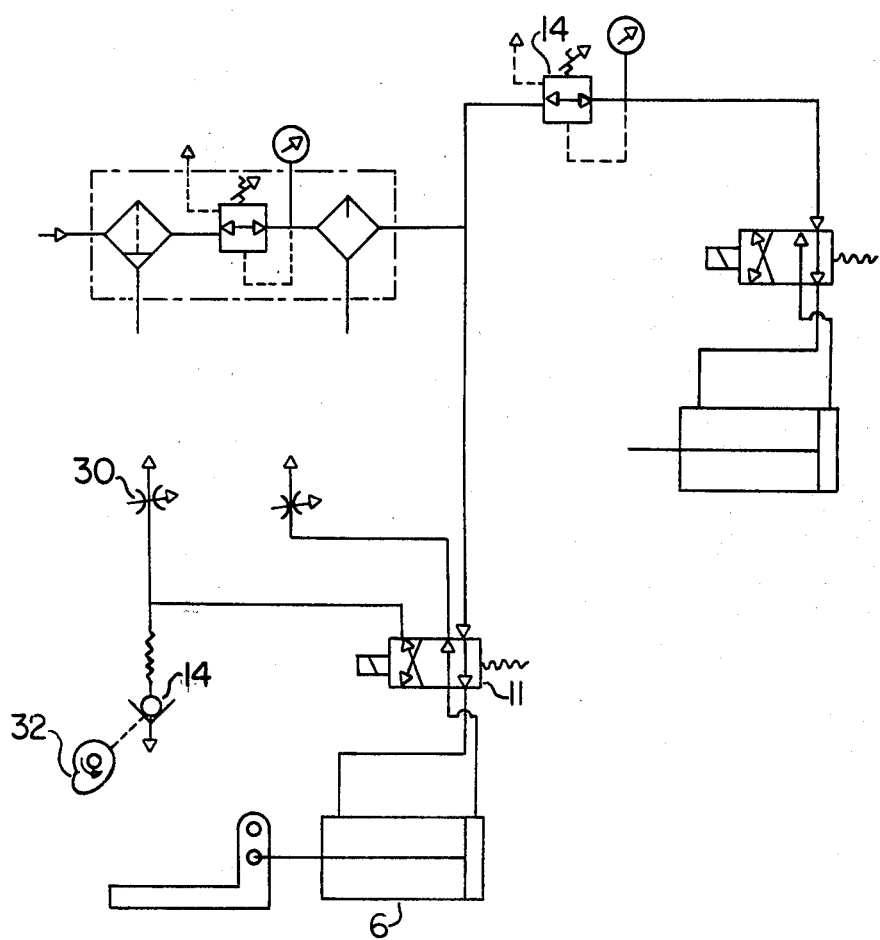
FIG. 5 is a pneumatic diagram for the complete dumping operation.

At this point lift platform 16 must traverse an arc of 100° to lift tray 34 to a point just pass vertical in order to make the tray fall off platform 16 and onto the top of hopper 1. To start platform 16 upward, a compression spring 9 (FIGS. 1 and 2) communicates with air-cylinder 6 and is used to assist air cylinder 6 in starting the upward motion. Compression spring 9 is connected between rigid mount 36 (FIG. 1) and lever support member 40 (FIG. 2). Lever arm 37 is connected to support member 40 and is pivotally connected to arm 37a, which in turn is fixed to shaft 31. The constant downward pull exerted by compression spring 9 on lever support member 40 and lever 37 results in a counter-clockwise rotational force on shaft 31 through arm 37a thereby exerting an outward force on air cylinder 6 and a lifting force on the tray support or platform 16. Therefore, when platform 16 ascends, thus compression spring 9 actuates to assist air cylinder 6 to lift. After lift platform 16 starts upward under maximum airflow, cam 32 actuates airswitch 14 (FIGS. 2 & 5), on the shaft of kick-off arm 7 which bypasses air flow control valve 30 (FIG. 5), in the "extend" exhaust port of solenoid valve 11. Valve 11 has 4 ports, one of which is the extend exhaust port. After platform 16 moves through the first 70° of travel, air switch 14 (FIGS. 2 & 5) reduces the air flow for the final 30° of travel, thus allowing the tray to fall softly onto the top of hopper 1 in an inverted position.

After the tray falls onto the top of hopper 1, the previously mentioned electronic time-delay relay 22 (FIG. 4) which electrically operates air valve 30, continues to hold platform 16 in a vertical position for one and one-half seconds, allowing tray 34 to settle onto the top of hopper 1. When tray 34 breaks contact with limit switch 12 (FIG. 1) which is located on platform 16, and when time-delay relay 22, (FIG. 4) times out and then de-energizes solenoid 11 (FIG. 1), double-acting air cylinder 6 is retracted, thus bringing platform 16 back to the original starting position. Simultaneously, on the downward movement of platform 16, spring loaded kick-off-arms 7 (FIG. 1) which communicate with shaft 31 of lifting platform 16 by means of bevel gears 10 (FIG. 2), pushes tray 34 off rails 5 beneath striker plate 4 on the top of hopper 1 and sends tray 34 to a washing cycle. When lift platform 16 reaches the bottom, limit switch 15 closes the circuit to ram solenoid 24 (FIG. 4), thus starting the cycle over again.

More specifically, the top of hopper 1, (FIG. 2) is fitted with stainless steel guide rails 5 across the top. These rails 5 extend beyond the top of hopper 1 to keep the trays 34 from falling into hopper 1 and allowing the trays to be moved off of the top of hopper 1 and removed to the washer (FIG. 6) by a chain conveyor. The main components of the dumper are the lift platform 16, the kick-off arms 7, and the cam operated pneumatic limit switch 14. The lift platform 16 is a spring loaded, pneumatically controlled table on which a hatchery tray sits for dumping. The platform table is slightly wider than a tray and has tapered uprights 38 (FIG. 6) as guides so that tray 34 will be centered over the hopper when dumped. Platform 16 is raised and lowered by a commercial 12-inch-long, double-acting pneumatic air cylinder 6. To assist air cylinder 6 in starting the load upward, an adjustable compression spring 9 is so situated that it developes enough thrust to override the weight of a loaded tray, thus requiring less air pressure. Lift platform 16 is hinged on a 1¼-inch shaft 31 and supported on both ends by flange-mounted pillow blocks (not shown). The complete assembly is fabricated out of angle iron and square tubing except for the platform itself, which is made from 16-gage sheet steel. Lift platform 16 is affixed to an angled support member 18. Angle support member 18 is located on the bottom of lifting platform 16. Platform 16 is set to rotate through an arc of 100°. Lifting platform 16 is designed to thus give support to the hatchery tray through this angle taking it just past the vertical so that it can turn over and onto the open top of hopper 1. Thus lifting platform 16 starts from the horizontal plane where it accepts the hatchery tray and takes it up and through 100° of arc travel turning it over onto the open top of hopper 1 so that the waste material contained in the hatchery tray may fall out into hopper 1. The angle of angled support member 18 will depend on the height of the conveyor (not shown) that feeds the trays. Therefore, the angle must be adjusted to allow for correct movement between the top of the conveyor to the top of hopper 1. The height of the conveyor of the instant invention was approximately 34" from the floor. The distance between the top of the conveyor and the top of the hopper 1 was approximately 18½". The angle set is approximately 110° in the case of the instant invention and is set to accommodate the existing height: Any adjustment to height or distance would change the angle. All necessary bracing is also made of light weight angle iron. The platform has two stainless steel stops 13, (only one shown) on the inner side to help position the tray and keep it from sliding off. Situated between the stops is the lift-platform (tray table) limit switch 12 (FIGS. 1 and 4), with two sets of normally closed (NC) contacts and one set of normally open (NO) contacts that sense the presence or absence of a tray. The (NO) contacts sense the presence of the tray and actuate the air cylinder to lift platform 16. One set of (NC) contacts is utilized in conjunction with a time delay relay 22 (FIG. 4) to hold platform 16 at a maximum ascent for 1½ seconds, while the other set of (NC) contacts disables the tray-loading mechanism so that another tray cannot be moved until platform 16 is ready to accept it.

Since platform 16 is moved swiftly through an arc of 100°, it is necessary to have some kind of air switch to reduce the air pressure on the last 30° to 40° of the arc of travel, and thus keep the tray from being thrown into striker plate 4 (FIG. 2), with excessive force. Striker plate 4 is located on top of hopper 1. This is accomplished by a cam actuated air switch 14 that reduces the pressure on air cylinder 6 through the last portion of the arc. This switch 14 bypasses the airflow control valve 30 (FIG. 5) in the "extend" exhaust port of spring-return solenoid valve 11. Switch 14 communicates with valve 30 by means of cam 32 (FIG. 2) which rotates into contact with switch 14. Cam 32 is preset to rotate into contact with switch 14 depending upon the angle of arc desired. In the case of the instant invention the last 30° to 40° were found to be the optimum distance in order to allow for the tray to settle on the top of hopper 1 correctly.

Figure 3:
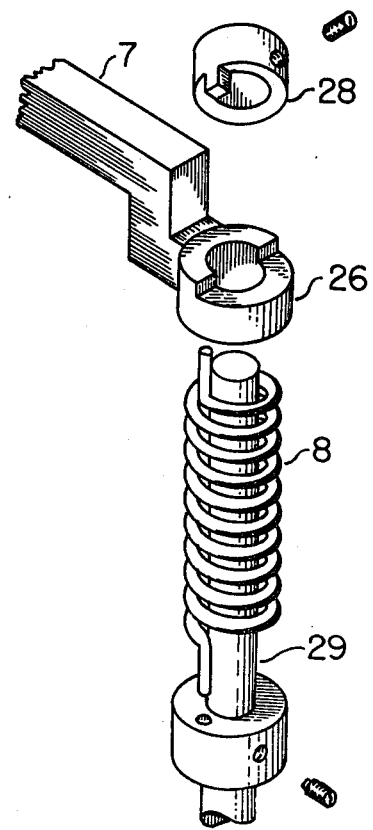
FIG. 3 is an exploded view of the spring-loaded kickoff arms for removal of trays from the hopper.

After the tray falls upside down onto hopper 1 it must be removed before the next tray can be dumped. Two kickoff arms 7 (FIG. 1) automatically push the tray off the top of hopper 1 onto the washer conveyor. As lift platform 16 descends, arms 7 mounted on shaft 29 are rotated by bevel gears 10 which communicate with hinge shaft 31 of platform 16. Thus, arms 7 push tray 34 off hopper 1 as a result of downward movement of platform 16. Hinge shaft 31 communicates between cylinder 6 and platform 16. Because this is a direct-drive mechanism, something is needed to prevent damage to the tray if it becomes lodged. Normally, torsion springs 8, put over the kickoff arm 7's shaft that turn the kickoff arms, produce enough force to slide the tray off the top of hopper 1. The top and bottom of the spring assemblies are rigidly mounted to the vertical shafts of arms 7 and the arms are mounted so that they will slip if pressure becomes too great on the tray. This is accomplished by using a lugged locking collar 26 and a notched collar 28 (FIG. 3) on each vertical shaft. When a lodged tray will not move, the spring 8 absorbs the torsion, leaving the tray with only the pressure of spring 8 against it. Kick-off arms 7 are made from 13½-inch-long, 1-inch, square tubing. They are located 15 inches apart to the left and right of the center of hopper 1. Each arm 7 is connected to its vertical 1-inch shaft by means of the 1-inch lugged locking collar 26 mentioned above, which turns on the shaft.

We claim:

1. A hatchery tray dumper comprising:
   (a) a hopper having an open top;
   (b) a tray dumping means adjacent said hopper, said dumping means including: a tray support means to receive a tray in a horizontal, upright position, means for lifting said tray up and through an arc, tilting said tray past vertical, and inverting said tray onto the open top of the hopper, thereby dumping the contents of the tray into the hopper, said lifting means further including a means of initially assisting said lifting means and said support means further including means for holding said tray support means in a vertical position for a delayed time interval as well as tapered uprights affixed thereto to act as guides for the tray so that the tray will be centered over the hopper when dumped, and a means to retract the support means after the horizontal tray is dumped;
   (c) speed control means connected to the dumping means to slow down the speed of the support means near the end of its lift cycle so as to prevent trays from hitting the hopper with excessive force;
   (d) a tray pushing means connected to said hopper and said dumping means to push the trays off the hopper in response to retraction movement of the support means;
   (e) a striker plate affixed to the top of the hopper to control the travel of said tray when the tray is inverted onto the top of the hopper; and,
   (f) a spring assembly rigidly mounted to the pushing means, said spring assembly comprising a torsion spring inserted over the shaft of the pushing means, and a lugged collar communicating with a notched collar to retain the torsion spring on the pushing means.

2. An automatic hatchery tray dumper comprising in combination:
   (a) a lifting platform to lift a hatchery tray containing waste materials up and through a 100° arc, thus tilting said tray past vertical and inverting it onto the open top of a hopper; said hopper to receive said waste material;
   (b) an electronic limit switch located on the top of said lifting platform to sense the absence or presence of said hatchery tray;
   (c) a lift platform double acting air cylinder communicating between said electronic limit switch and said lifting platform by means of air feed from a lift platform solenoid air valve;
   (d) kick-off-arms communicating with said lifting platform to push said hatchery tray off of the open top of said hopper after the waste is dumped out of said hatchery tray into said hopper;
   (e) a cam actuated air switch located on said kick-off-arm and communicating with said lift platform solenoid air valve which controls the air flow to said double acting air cylinder and thus controls the speed of lift or descent of said lifting platform.

3. The apparatus of claim 2 including: a compression spring which communicates with the double acting air cylinder to provide initial lift to said lifting platform.

4. The apparatus of claim 3 further including: an electronic time delay relay which communicates with said platform to hold said lifting platform in a vertical position for a delayed time.

5. The apparatus of claim 4 further including: a hinge shaft which communicates between the double acting air cylinder and lifting platform.

6. The apparatus of claim 5 further including: a spring assembly rigidly mounted to a shaft on the kick-off-arm, said spring assembly comprising a torsion spring inserted over the shaft of said kick-off-arm, and a lugged collar communicating with a notched collar to retain said torsion spring on said kick-off-arm shaft.

7. The apparatus of claim 6 further including: a support member affixed to the bottom of the lifting platform, said support member angled at approximately 110°.

8. The apparatus of claim 7 further including a solid base member affixed to the lower end of the double acting air cylinder, said base member to give solid support to the double acting air cylinder when the air cylinder actuates to push the lifting platform up.

9. The apparatus of claim 8 wherein the electronic limit switch comprises one set of normally open contacts and two sets of normally closed contacts.

10. The apparatus of claim 9 further including a rotating cam which rotates to supply contact between the pneumatic air limit switch and the air solenoid valve.

* * * * *